United States Patent Office 3,018,470
Patented Jan. 23, 1962

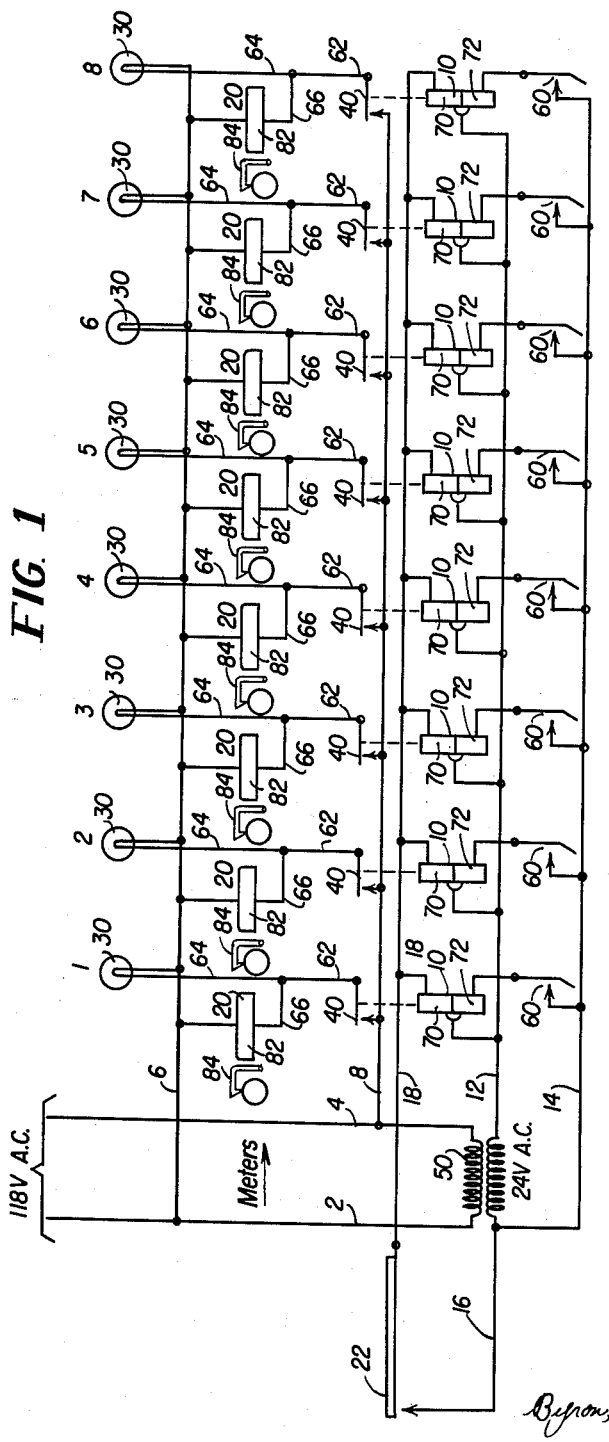

3,018,470
ADMISSION CONTROL SYSTEM
Joseph E. Stancher, Chicago, Ill., assignor to Essaness Theater Corporation, Chicago, Ill., a corporation of Delaware
Filed Aug. 24, 1960, Ser. No. 51,600
8 Claims. (Cl. 340—51)

This invention relates in general to an admission control system and, in particular, to an admission control system for use with an admission center through which vehicles normally pass and wherein a predetermined fare is normally collected.

One of the key centers of a business such as an outdoor theater or the like is the admission center wherein the bargain and sale of the admission is transacted. It is essential that the customer realizes the consideration which he is putting forward, and it is also essential that the management is aware of the transaction, and further that the management has an accurate account of the series of transactions which normally occur.

In the operation of a business such as an outdoor theater, wherein a group arrives in a unit, the head of the group may not be actually acquainted with the charge of admission inasmuch as many outdoor theaters do not charge for children under a specified age. Also, due to the good spirits of the group in such a situation, the head of the group may at times deal more lightly with the transaction than he would in his normal business life. Therefore, for the protection of the group there should be an easily viewed indication of the admission charge, so that the head of the group may properly count his change and further be acquainted with the policies of the establishment.

It is also very essential that the admission charge be monitored by the management, in order that management can more fully and clearly acquaint the employees with the particular policies which the management has set forth. It is also very essential that the admission charge be readily viewed by a monitor, and that the monitor have visual access to a plurality of admission centers to insure that the policies of the management are followed through and to instruct the employees in the particular aspects thereof.

Modern business cannot exist without an accurate and efficient bookkeeping system, and further if the bookkeeping system has incorporated therein automatic recorders for indicating the number of admissions and the number of admissions per vehicle which have entered, there is also provided to management a more thorough understanding of the customer and the customer's habits. Also a record of the size of the group which enter an establishment such as an outdoor theater is very useful in that the management may provide services and considerations in accordance therewith which will induce the groups to return again.

It is, therefore, an object of this invention to provide an admission control system for an establishment such as an outdoor theater, which informs the customer of the charge of the admission and also aids in the monitoring and bookkeeping of the establishment.

It is a further object of this invention to provide an admission control system including indicating apparatus which may be easily viewed by both the customer and the management, and which has incorporated therein recording apparatus to aid the management.

It is a further object of this invention to provide an admission control system of a simple and inexpensive construction and which provides a visual indication of the circumstances of the transaction, and also provides a permanent record which is easily viewable and which is helpful for bookkeeping purposes.

Briefly what has been provided is an admission control system including a remote control circuit arrangement which may be manually operated by a person such as an usher or cashier collecting fares from incoming vehicles in an establishment such as an outdoor theater. The usher activates the remote control circuit arrangement by momentarily pressing a button switch corresponding to the number of persons which are charged an entrance fee in the incoming vehicle. The remote control relay circuit arrangement is thereby energized and a counter is activated which records the entrance of the vehicle and the number of paying customers contained therein. At the same time a panel light is activated thereby exposing to the view of the customers the amount charged. The panel is positioned in full view of the incoming customers and may be easily viewed thereby. The panel is also readily viewed by a monitor to insure that the policies of the establishment are maintained. As soon as the vehicle enters the establishment, such as an outdoor theater, a control switch positioned in the roadway behind the admission center is activated by the vehicle to extinguish the light in the panel and the circuit arrangement is thereby cleared to be ready for the entrance of the next vehicle.

Other features and advantages of the invention will be more readily understood if the following is viewed in light of the drawings in which:

FIGURE 1 is a schematic illustration of one embodiment of the invention;

FIGURE 2 is a perspective illustration of the viewing panel utilized in one embodiment of the invention;

FIGURE 3 is a front elevational view of the panel illustrated in FIGURE 2; and

FIGURE 4 is a rear elevational view of the panel illustrated in FIGURE 2.

Referring now to FIGURE 1 there is illustrated therein a plurality of spring loaded manually operated push button switches 60 and a plurality of remote control relays 10 having operably associated therewith a pair of normally open relay contacts 40. Relay contacts 40 have associated therewith a plurality of indicating lamps 30 and a plurality of counter-mechanisms 20. Operating power is supplied to the plurality of indicating lamps 30 and the plurality of counter-mechanisms 20 from a line source such as a 118 volts alternating current line through the normally open contacts 40 operably associated with the remote control relays 10. Specifically, power is transmitted to the indicating lamps 30 and counter-mechanisms 20 from the lines 2 and 4 connected to the line voltage source through the lines 6 and 8, respectively, and further through the normally open contacts 40 of the relays 10.

The remote control relays 10 consist of a relay having normally open contacts and two coils wound on the same core. When one of the two coils of the relay 10 is energized, the normally open contacts 40 are closed, and further the relay is of such a type that the normally open contacts 40 will remain closed even if the coil which has been energized is subsequently deenergized. Once the normally open contacts 40 are closed positive force is required to reopen the normally open contacts 40. This positive force is provided by the second coil, which is mounted on the core of the relay 10, and upon energization of this second coil the normally open contacts are moved from their closed position back to their normal open position. Relays of this type are available on the market and specifically they are available at the General Electric Corporation and they bear the catalog designation RR3. Therefore, the remote control relays 10 may operate on pulses of energy, and therefore may be utilized with spring-loaded switches such as switches 60 which have the characteristic of only being closed as long as pressure is applied to the switch, an example of such a switch is the ordinary door-bell button switch.

Operating current is supplied to the relays 10 through a step-down transformer 50 connected to lines 2 and 4 which are in turn connected to the line voltage source. The secondary of the step-down transformer 50 is preferably a 24 volt winding. The secondary of the step-down transformer 50 is connected to one winding 72 of the plurality of remote control relays 10 through lines 12 and 14 and the normally open contacts of manually operated switches 60.

The secondary winding of the step-down transformer 50 is connected to a second winding 70 of the relays 10 through line 16, a normally open pneumatically operated switch 22 positioned in the roadway behind the admission center, line 18, the second winding 70 of the relays 10, and back through line 12 to the other side of the secondary winding of the step-down transformer 50.

The counter-mechanisms 20 may be of any of the types which are readily available on the market and the counter-mechanisms 20 may comprise a solenoid coil 82 and an operably associated ratchet type indicator 84. The counter-mechanisms 20 may be ordinary decimal type counters, wherein the counter is moved one digit for each impulsing of the solenoid 82 associated therewith. The counter-mechanisms 20 should be selected to have as much counting capacity as is required. The counter-mechanisms 20 provide a permanent easily read record of the number of energizations of each individual solenoid coil 82, and therefore records the number of admissions of a certain kind which have occurred. In other words, if a specific counter-mechanism 20 is positioned in the circuit associated with three paying customers in a vehicle, then the digits registered in the counter-mechanism will correspond to the number of vehicles which have passed through the admission center having three paying customers therein. The plurality of lamps 30 may be readily selected from those on the market. The pneumatically operated switch 22 may also be selected from those which are presently on the market.

In the preferred system the plurality of spring loaded manually operated switches 60 are positioned in an enclosure adjacent an admission center booth so as to be easily operated by the attendant usher or cashier. The plurality of relays 10, the transformer 50, and the plurality of counter-mechanisms 20 are mounted on a common chassis which is located in any convenient spot readily accessible to the management such as in or adjacent to an admission center booth. The plurality of manually operated switches 60 may be connected to the plurality of relays 10 and the transformer 50 by suitable wiring. The plurality of lamps 30 are positioned within a viewing panel 32, for example, the panel illustrated in FIGURE 2.

Panel 32 is of a rectangular box-like shape and comprises solid opaque surfaces 34 on top and on the bottom and solid opaque surfaces 36 on each side. The front of the panels 32 may be comprised of opaque or translucent glass having substantially transparent or translucent indicia formed therein. The rear or back of the panels 32 may also be comprised of opaque or translucent glass also having formed thereon transparent or translucent indicia. The indicia on the front of the panel 32 is illustrated in FIGURE 3 and the indicia on the rear of panel 32 is illustrated in FIGURE 4. The appropriate panel sector lights up in response to the activation of the associated lamp 30 and the indicia may be clearly read by the customer. For example, if the cashier depresses a manual switch 60 corresponding to two fares, the second panel from the left and bottom as viewed in FIGURE 3 will light up and the indicia $2.50 may be easily viewed by the customer. Also positioned within the panel 32 are four lamps 38 not shown in FIGURE 1 for simplicity which are always activated or lighted and which are positioned behind translucent or transparent indicia which reads "Please Count Your Change This Is Your Admission" as clearly seen in FIGURE 3. The rear of the panel 32 may be viewed by a monitor and indicates the number of paying fares and not the fares translated into dollars and cents, as clearly seen in FIGURE 4. As previously stated pneumatic switch 22 is positioned in the roadway behind the admission center and may be any of the well-known pneumatic type switches which are presently on the market.

When an incoming vehicle arrives at the admission center the attendant usher or cashier determines the number of paying fares and informs the customer as to the proper amount. The attendant usher or cashier accepts the customer's money and depresses one of the manually operated switches 60 corresponding to the number of admissions. The corresponding lamp 30 in panel 32 is energized in response to the closing of the manually operated switch 60 thereby lighting that portion of panel 32 corresponding to the fare charged enabling the customer to view the panel 32 and determine what the exact charge has been. The attendant usher or cashier then makes the proper change and delivers the change to the customer. The customer then drives through the admission center and trips a pneumatic switch 22, positioned in the roadway behind the admission center, to extinguish the lamp in the panel 32 corresponding to the amount charged for his admission.

Referring to FIGURE 1 for the operative details it can be seen that upon energization of any of the manually operated switches 60 the corresponding relay 10 has one of its two coils energized. The energization path being from the secondary winding of the transformers 50 through the line 14, the normally open contacts of the manually operated switch 60, one of the windings 72 of the relay 10 and back through the line 12 to the other side of the secondary winding of the transformer 50. In response to the energization of winding 72 of the relay 10, the relay 10 causes the normally open contacts 40 associated with the particular relay 10 to close. Relay 10 is of such a design that the normally open contacts 40 will remain in a closed position once the relay has been energized. Therefore, the manually operated switches 60 need only be depressed or operated momentarily to cause the normally open contacts 40 of the relay 10 to close and remain in the closed position.

As soon as the normally open contacts 40 are closed by the operation of the associated relay 10, a circuit path is provided to the associated lamp 30 and the associated counter-mechanism 20. The associated lamp 30 is connected to the line source such as a 118 volt alternating current line source through line 4, line 8, through the presently closed contacts 40, lines 62 and 64 through the lamp 30 and back through the lines 6 and 2 to the other side of the alternating current line source. At the same time counter-mechanism 20 is connected to the alternating current line source through lines 4 and 8, the presently closed contacts 40, line 62, line 66, through the solenoid winding 82 of the counter-mechanism 20, back through the lines 6 and 2 to the other side of the alternating current line source.

As soon as the vehicle enters and passes through the admission center, it activates the normally open pneumatic switch 22 which is positioned in the roadway behind the admission center to thereby close the switch 22. The closing of the normally open switch 22 provides a path from the secondary of the transformer 50 to the other winding 70 of the activated relay 10. A path is provided from one side of the secondary of the transformer 50 through line 16, presently closed switch 22, line 18, through winding 70 of the relay 10, and back through the line 12 to the other side of the secondary winding of the transformer 50. The relay 10 is so designed that the energization of the second winding 70 of the relay 10 will cause the relay contacts 40 to reopen and to stay in the open position even when winding 70 is subsequently de-energized until the other of the windings 72 of the relay 10 is energized.

When the associated lamp 30 is energized as previously described corresponding portion of the panel 32 is illuminated enabling the customer and a monitor to view the indicia formed on the panel and the customer is informed of the total fare and the monitor is informed of the total number of paying customers recorded and charged for the particular vehicle.

The energization of solenoid 82 of the counter-mechanism 20 moves the ratchet arm 84 one position to provide a permanent easily read record of the transaction.

Therefore, there has been provided an admission control system wherein the number of vehicles passing through the admission center may be determined by merely adding up the total number of vehicles that have entered with the various numbers of paying passengers. At the same time the breakdown as to paying customers per vehicle is provided directly by the counter mechanisms 20. The customer has merely to look at the conveniently placed panel 32 to see what he has been charged for the admission and also a monitor may be stationed in full view of several of these admission centers and may be able to prevent any misunderstandings or mistakes from occurring.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An admission control system for use with an admission center through which vehicles normally pass and wherein a predetermined fare is normally collected, a plurality of switches corresponding to the plurality of fares that entering vehicles are charged, said plurality of switches normally positioned adjacent said admission center, a viewing panel comprising a plurality of indicating elements corresponding to said plurality of switches, said viewing panel positioned in full view of said vehicles, a vehicle operated switch normally positioned in a roadway adjacent said admission center on the side of said admission center through which said vehicles pass through last, a plurality of contact activating means having associated therewith a plurality of contacts corresponding to said plurality of switches, said plurality of contact activating means being connected to said plurality of switches, said vehicle operated switch and a first power source, said plurality of contacts being connected to said plurality of indicating elements and a second power source, the activation of any of said plurality of switches connecting said first power source to the contact activating means of said plurality of contact activating means corresponding to the activated switch of said plurality of switches thereby causing the contacts of said plurality of contacts corresponding to the activated switch to connect said second power source to the indicating element in said viewing panel corresponding to the activated switch whereby the indicating element corresponding to the activated switch is activated, the subsequent activation of said vehicle operated switch element connecting said plurality of contact activating means to said first power source in such a manner as to cause the associated contacts of said plurality of contact activating means to disconnect said second power source from the indicating element corresponding to the activated switch.

2. An admission control system for use with an admission center through which vehicles normally pass and wherein a predetermined fare is normally collected, a plurality of switches corresponding to the plurality of fares that entering vehicles are charged, said plurality of switches normally positioned adjacent said admission center, a viewing panel comprising a plurality of indicating elements corresponding to said plurality of switches, said viewing panel positioned in full view of said vehicle, a vehicle operated switch normally positioned in the roadway adjacent said admission center on the side through which said vehicles pass through last, a plurality of contact activating means corresponding to said plurality of switches and having associated therewith a plurality of contacts corresponding to said plurality of switches, said plurality of switches being connected to said plurality of contact activating means, said vehicle operated switch and a first power source, said plurality of contacts being connected to said plurality of indicating elements and a second power source, the activation of any of said plurality of switches connecting said first power source to the contact activating means corresponding to the activated switch thereby causing its associated contacts to connect said second power source to the indicating element in said viewing panel corresponding to the activated switch, the activation of said vehicle operated switch element connecting said first power source to said plurality of contact activating means in such a manner as to cause the contact activating means corresponding to the activated switch to cause its associated contacts to disconnect said second power source from the indicating element in said viewing panel corresponding to the activated switch.

3. An admission control system for use with an admission center through which vehicles normally pass and wherein a predetermined fare is normally collected, a plurality of switches corresponding to the plurality of fares that entering vehicles are charged, said plurality of switches normally positioned adjacent said admission center, a viewing panel comprising a plurality of indicating elements corresponding to said plurality of switches, said viewing panel positioned in full view from said vehicles, vehicle operated switch normally positioned in the roadway adjacent said admission center on the side thereof through which said vehicles pass through last, a plurality of contact activating means having associated therewith a plurality of contacts having a first position and a second position, said plurality of contact activating means comprising a first circuit and a second circuit, the energization of each of said first circuits of said plurality of contact activating means causing the associated contacts of said plurality of contacts to assume a first position, the energization of each of said second circuits of said plurality of contact activating means causing the associated contacts of said plurality of contacts to assume a second position, said first circuits of said plurality of contact activating means being connected to said plurality of switches and a first power source, said second circuits of said plurality of contact activating means being connected to said vehicle operated switch and said first power source, said plurality of contacts associated with said plurality of contact activating means being connected to said plurality of indicating elements and a second power source, the activation of any of said plurality of switches connecting said first power source to the first circuit of the contact activating means of said plurality of contact activating means corresponding to the activated switch thereby causing the associated contacts of said plurality of contacts to assume a first position so as to connect said second power source to the indicating element in said viewing panel corresponding to the activated switch, the activation of said vehicle operated switch element connecting said second circuit of said contact activating means corresponding to the activated switch to said first power source so as to cause the associated contacts of the contact activating means corresponding to the activated switch to assume a second position to thereby disconnect said second power source from the indicating element corresponding to the activated switch.

4. An admission control system for use with an admission center through which vehicles normally pass and wherein a predetermined fare is normally collected, a plurality of switches corresponding to the plurality of fares that entering vehicles are charged, said plurality of switches normally positioned adjacent said admission center, a viewing panel comprising a plurality of indicating elements corresponding to said plurality of switches, said viewing panel positioned in full view of said vehicles, a vehicle operated switch normally positioned in a roadway adjacent said admission center on the side of said admission center through which said vehicles pass through last, a plurality of relays having associated therewith a plurality of contacts having a first and a second position, said plurality of relays having a first circuit and a second circuit, the energization of said first circuits causing the associated contacts to be in a first position, the energization of said second circuits causing the associated contacts to be in a second position, said first circuit of said plurality of relays connected to said plurality of switches and a first power source, said second circuit of said plurality of relays being connected to said vehicle operated switch and said first power source, said plurality of contacts associated with said relays being connected to said plurality of indicating elements and a second power source, the activation of any of said plurality of switches connecting said first power source to the first circuit of the relay corresponding to the activated switch thereby causing the associated contacts of said relay corresponding to the activated switch to assume a first position whereby said second power source is connected to the indicating element in said viewing panel corresponding to the activated switch, the activation of said vehicle operated switch element connecting the second circuit of said plurality of relays to said first power source so as to cause the associated contacts of the relay of said plurality of relays corresponding to the activated switch to assume a second position whereby disconnecting said second power source from the indicating element corresponding to the activated switch.

5. An admission control system as in claim 4 wherein said viewing panel comprises a front face and a rear face having indicia formed thereon in such a manner so as to permit the transmission of light therethrough so as to make the indicia readable at a distance and wherein said plurality of indicating elements are a plurality of lamps positioned within said viewing panel behind said front and rear faces having indicia formed thereon.

6. An admission control system for use with an admission center through which vehicles normally pass and wherein a predetermined fare is normally collected, a plurality of spring loaded push-button switches corresponding to the plurality of fares that entering vehicles are charged, said plurality of switches normally positioned adjacent said admission center, a viewing panel comprising a front surface and a rear surface, said front surface and said rear surface having a plurality of indicia sectors corresponding to said plurality of switches formed thereon, said plurality of indicia sectors being light transmissive in such a manner so as to enable the indicia in said indicia sectors to be read at a distance, a plurality of indicating lamps corresponding to said plurality of switches positioned within said viewing panel adjacent the corresponding indicia sectors of said front surface and said rear surface of said viewing panel, said viewing panel positioned in full view of said vehicles, a vehicle operated switch normally positioned in a roadway adjacent said admission center on the side of said admission center through which said vehicles pass through last, a plurality of relays corresponding to said plurality of switches each having associated therewith a pair of contacts having a first position and a second position, each of said plurality of relays having associated therewith a first circuit and a second circuit, the energization of said first circuits causing said associated pairs of contacts to assume a first position and to remain in that position even after the subsequent de-energization of said first circuit, the energization of said second circuits of said plurality of relays causing the associated pairs of contacts to assume a second position and to remain in that position even upon the de-energization of said second circuit, said first circuit of said plurality of relays connected to said plurality of switches and a first power source, said second circuit of said plurality of relays connected to said vehicle operated switch element and said first power source, the pairs of contacts associated with said plurality of relays connected to said indicating lamps and a second power source, the activation of any of said plurality of switches causing said first circuit of the relay of said plurality of relays corresponding to the activated switch to be connected to said first power source thereby energizing the first circuit of said relay corresponding to the activated switch thereby causing the pair of contacts associated with the relay corresponding to the activated switch to assume a first position whereby the indicating lamp corresponding to the activated switch is connected to said second power source and energized whereby the indicia in the corresponding indicia sector may be read easily at a distance from both the rear and the front of the viewing panel, the activation of said vehicle activated switch connecting the second circuit of the relay corresponding to the activated switch to the first power source thereby energizing the last mentioned second circuit whereby the contacts associated with the relay corresponding to the activated switch are placed in a second position thereby causing said second power source to be disconnected from the indicating lamps corresponding to the activated switch.

7. An admission control system as in claim 6 including a plurality of counter-mechanisms connected in parallel with said plurality of indicating lamps, said plurality of counter-mechanisms comprising counting means responsive to an electrical signal and visual indicating means, said counting means responsive to said electrical signal causing said visual indicating means to be advanced one step for each energization of said counting means.

8. An admission control system for use with an admission center through which vehicles normally pass and wherein a predetermined fare is normally collected, a plurality of spring loaded push-button switches having normally open contacts corresponding to the plurality of fares that entering vehicles are charged, said plurality of switches normally positioned adjacent said admission center, a viewing panel comprising a plurality of indicia sectors corresponding to said plurality of switches positioned on the front surface and on the rear surface of said viewing panel, said plurality of indicia sectors being light transmissive, a plurality of indicating lamps positioned within said viewing panel and adjacent said plurality of indicia sectors of said front surface and of said rear surface of said viewing panel, the energization of said plurality of indicating lamps causing the indicia of said indicia sectors to be easily read at a distance, said viewing panel positioned in full view of said vehicles, a vehicle operated switch normally positioned in a roadway adjacent said admission center on the side of said admission center through which said vehicles pass through last, a plurality of relays corresponding to said plurality of switches, each of said relays having associated therewith a pair of contacts having a first position and a second position, each of said plurality of relays having associated therewith a first circuit and a second circuit, the energization of said first circuit causing the contacts associated with the relay which has its first circuit energized to assume a first position, the energization of said second circuit causing the contacts associated with the relay having its second circuit energized to assume a second position, said first circuits of said plurality of relays connected to said plurality of switches and a first power source, the second circuits of said plurality of relays connected to said vehicle operated switch and said first power source, the pairs of contacts associated with said plurality of relays connected to a second power source and said plurality of indicating lamps, the activation of any of said plurality of switches causing the first circuit of the relay corresponding to the activated switch to be energized to thereby place the associated pair of contacts in said first position thereby connecting said second power source to said indicating lamps associated with the activated switch, the activation of said vehicle operated switch causing the second circuit of the relay corresponding to the activated switch to be energized to thereby cause the associated pair of contacts of the relay corresponding to the activated switch to be in a second position thereby disconnecting said indicating lamp corresponding to the activated switch from said second power source.

No references cited.